(12) United States Patent
Kim

(10) Patent No.: US 7,843,532 B2
(45) Date of Patent: Nov. 30, 2010

(54) LIQUID CRYSTAL DISPLAY PANEL WITH COLOR FILTERS AND METHOD OF FABRICATING THE SAME

(75) Inventor: Woo Jin Kim, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 510 days.

(21) Appl. No.: 11/011,107

(22) Filed: Dec. 15, 2004

(65) Prior Publication Data

US 2005/0128383 A1    Jun. 16, 2005

(30) Foreign Application Priority Data

Dec. 16, 2003    (KR) .................... 10-2003-0091800

(51) Int. Cl.
*G02F 1/1335*    (2006.01)
*G09G 3/36*    (2006.01)

(52) U.S. Cl. .................. 349/106; 349/107; 349/108; 349/109; 345/88

(58) Field of Classification Search ......... 349/106–109; 345/88
See application file for complete search history.

(56) References Cited

U.S. PATENT DOCUMENTS

| | | | |
|---|---|---|---|
| 5,712,064 A * | 1/1998 | Miyazaki et al. ............... | 430/7 |
| 5,790,219 A * | 8/1998 | Yamagishi et al. .......... | 349/106 |
| 5,968,688 A * | 10/1999 | Masuda et al. ................. | 430/7 |
| 5,998,101 A * | 12/1999 | Park et al. .................... | 430/321 |
| 6,671,025 B1 * | 12/2003 | Ikeda et al. .................. | 349/156 |
| 6,815,125 B1 * | 11/2004 | Okabe et al. .................... | 430/7 |
| 6,870,584 B2 * | 3/2005 | Kawase et al. .............. | 349/106 |
| 6,874,883 B1 * | 4/2005 | Shigemura et al. .......... | 347/106 |
| 6,897,918 B1 * | 5/2005 | Nonaka et al. .............. | 349/106 |
| 2003/0063238 A1 * | 4/2003 | Yi et al. ...................... | 349/106 |
| 2003/0147026 A1 * | 8/2003 | Wachi ......................... | 349/106 |
| 2004/0070705 A1 * | 4/2004 | Kobayashi .................. | 349/106 |

FOREIGN PATENT DOCUMENTS

| | | |
|---|---|---|
| JP | 2000-330121 | 11/2000 |
| KR | 95-008936 | 8/1995 |

OTHER PUBLICATIONS

Summary of Document D2 in Chinese Office Action, pp. 1-6.

* cited by examiner

*Primary Examiner*—Hoan C Nguyen
(74) *Attorney, Agent, or Firm*—McKenna Long & Aldridge LLP

(57) ABSTRACT

The present invention relates to a liquid crystal display panel that is adaptive for preventing rubbing defects and the fabricating method thereof. A liquid crystal display panel according to an embodiment of the present invention includes a black matrix on a substrate; and color filters formed at pixel areas which are defined by the black matrix, wherein a distance between the adjacent color filters is between about 0.1 μm and about 5 μm.

9 Claims, 10 Drawing Sheets

LIQUID CRYSTAL DISPLAY PANEL WITH COLOR FILTERS AND METHOD OF FABRICATING THE SAME

This application claims the benefit of Korean Patent Application No. P2003-91800, filed in Korea on Dec. 16, 2003 which is hereby incorporated by reference for all purposes as if fully set forth herein.

BACKGROUND OF THE INVENTION

1. Field of the Invention

The present invention relates to a liquid crystal display panel, and more particularly to a liquid crystal display panel that is adaptive for preventing rubbing defects and a fabricating method thereof.

2. Discussion of the Related Art

Generally, a liquid crystal display device displays a picture by controlling the light transmissivity of liquid crystal by use of an electric field. For this, the liquid crystal display device includes a liquid crystal display panel on which liquid crystal cells are arranged in a matrix shape and a driving circuit to drive the liquid crystal display panel. The liquid crystal display panel has a common electrode and a pixel electrode for applying an electric field to each of the liquid crystal cells. Generally, the pixel electrode is formed on a lower substrate of a liquid crystal cell, whereas the common electrode is integrated onto the surface of an upper substrate that faces the lower substrate. Each of the pixel electrodes is connected to a thin film transistor (hereinafter, referred to as "TFT"), which is used as a switching device. The pixel electrode along with the common electrode drives the liquid crystal cell in accordance with the data signal supplied through the thin film transistor.

FIG. 1 is a diagram representing a related art liquid crystal display panel.

Referring to FIG. 1, a liquid crystal display panel of related art includes a color filter array substrate having a black matrix 44, a color filter 46, a common electrode 48 and an upper alignment film 50a sequentially formed on an upper substrate 42; a thin film transistor array substrate having a TFT, a pixel electrode 22 and a lower alignment film 50b formed on a lower substrate 1; and a liquid crystal (not shown) injected into an inner space between the color filter array substrate and the thin film transistor array substrate.

The black matrix 44 is formed to overlap gate lines and data lines (not shown) and a TFT area of the lower substrate 1, thereby defining a pixel area where the color filter 46 is to be formed. The black matrix 44 prevents light leakage and absorbs external light in order to improve the contrast ratio.

The color filter 46 is formed at the pixel area which is defined by the black matrix 44. The color filter 46 is formed by separate red R, green G, blue B filters to produce their respective colors. The distance a1 between the adjacent color filters 46 is generally set to be around 5 μm to 7 μm.

During operation, a common voltage is applied to the common electrode 48. The common voltage is the reference voltage for the potential difference between the common electrode 48 and the pixel electrode 22.

The TFT includes a gate electrode connected to the gate line (not shown), a source electrode 8 connected to the data line (not shown), and a drain electrode 10 connected to the pixel electrode 22 through a drain contact hole 26. The TFT includes semiconductor layers 14 and 16 to form a conductive channel between the source electrode 8 and the drain electrode 10 when a gate voltage is applied to the gate electrode 6. The TFT responds to a gate signal from the gate line (not shown) to selectively supply a data signal from the data line (not shown) to the pixel electrode 22.

The pixel electrode 22 is located at a pixel area defined by the data line (not shown) and the gate line (not shown) and is formed of a transparent conductive material that has high light transmissivity. The pixel electrode 22 is formed on a protective film 18 spread substantially over the entire surface of the lower substrate 1, and is electrically connected with the drain electrode 10 through the drain contact hole 26 that penetrates a protective film 18. When a data signal is supplied through the TFT, the pixel electrode 22 generates a potential difference with the common electrode 48 formed on the upper substrate 42, and thus creates an electric field between the two electrodes. The electric field causes the liquid crystal molecules located between the lower substrate 1 and the upper substrate 42 to rotate due to its dielectric anisotropy. Controlling the orientation of the liquid crystal molecules in this way controls the amount of light from a light source that is transmitted toward the upper substrate 42 through the pixel electrode 22.

The upper/lower alignment films 50a and 50b for aligning liquid crystal are formed by having an alignment material such as polyimide spread respectively on the color filter array substrate and the TFT array substrate, and then rubbing the polyimide in a rubbing process.

The fabricating method of the color filter array substrate is described as follows.

First, after an opaque metal is deposited on the upper substrate 42, the opaque material is patterned by a photolithography procedure using a mask and an etching process to form a black matrix 44. A photosensitive red resin R is deposited over the entire surface of the upper substrate 42 where the black matrix 44 has been formed. A mask having an exposure area and an blocking area is aligned on the upper substrate 42 where the red resin R has been deposited. Subsequently, the red resin R is exposed through the exposure area, and the exposed resin is removed by a photolithography procedure using the mask and the etching process; and the red resin R that has not been exposed remains to form a red color filter 46R.

A green resin G is deposited over the entire surface of the upper substrate 42 on which the red color filter 46R has been formed. By substantially repeating the mask process described above, a green color filter 46G is formed. The distance A1 between the adjacent green color filter 46G and the red color filter 46R is set to be about 5 μm~7 μm with the black matrix 44 between them.

A blue resin B is deposited over the entire surface of the upper substrate 42 where the green color filter 46G has been formed. By substantially repeating the mask process described above, the blue color filter 46B is formed. The distance a1 between the adjacent blue color filter 46B and the red color filter 46R is set to be about 5 μm~7 μm with the black matrix 44 between them.

A transparent electrode material is then deposited over the entire surface of the upper substrate where the red, green, blue color filters 46R, 46G, 46B have been formed, thereby forming the common electrode 48. An alignment material such as polyimide is then spread over the upper substrate 42 where the common electrode 48 has been formed, forming the upper alignment film 50a.

A rubbing process, illustrated in FIG. 2, is carried out so that liquid crystal molecules are arranged in a substantially uniform direction on the upper substrate 42 where the upper alignment film 50a has been formed. In doing this, the surface of the upper alignment film 50a is rubbed with a rubbing cloth 72, which is affixed to a rubbing roller 70, at a uniform pressure and speed to align the polymer chain of the surface of the upper alignment film 50*a*, thereby determining the alignment direction for the liquid crystal. A coating material is coated in the rubbing cloth 72.

The liquid crystal display panel has a distance a1 between the red color filter 46R, the green color filter 46G and the blue color filter 46B set to be about 5 μm to 7 μm. When the rubbing cloth 72 is used to rub this part, the coating material coated on the rubbing cloth 72 is separated due to a reverse taper phenomenon of the photo-resist of the color filters 46, thereby causing the damage to the rubbing cloth 72.

Accordingly, if the coating on the rubbing cloth 72 material is separated, the rubbing process is not carried out properly and may cause rubbing defects.

SUMMARY OF THE INVENTION

Accordingly, the present invention is directed to a liquid crystal display panel and method of fabricating the same that substantially obviates one or more of the problems due to limitations and disadvantages of the related art.

An advantage of the present invention is to provide a liquid crystal display color filter design that reduces rubbing defects caused during fabrication.

Another advantage of the present invention is to provide a method for fabricating a liquid crystal display that reduces rubbing defects caused during fabrication.

To achieve these and other advantages and in accordance with the purpose of the present invention, as embodied and described herein, a liquid crystal display panel comprises a black matrix on a substrate, the black matrix defining a pixel area; and a plurality of color filters formed at the pixel area, wherein a distance between the adjacent color filters is between about 0.1 μn and about 5 μm.

To achieve these and other advantages and in accordance with the purpose of the present invention, as embodied and described herein, a method of fabricating a liquid crystal display panel comprises forming a black matrix on a substrate, the black matrix defining a pixel area; and forming color filters on the pixel area, wherein a distance between the adjacent color filters is between about 0.1 μm and about 5 μm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with description serve to explain the principles of the invention.

DETAILED DESCRIPTION OF THE ILLUSTRATED EMBODIMENTS

Reference will now be made in detail to embodiments of the present invention, examples of which are illustrated in the accompanying drawings. Hereinafter, the illustrated embodiments of the present invention will be described with reference to FIGS. 3 to 4G.

Figure 1:
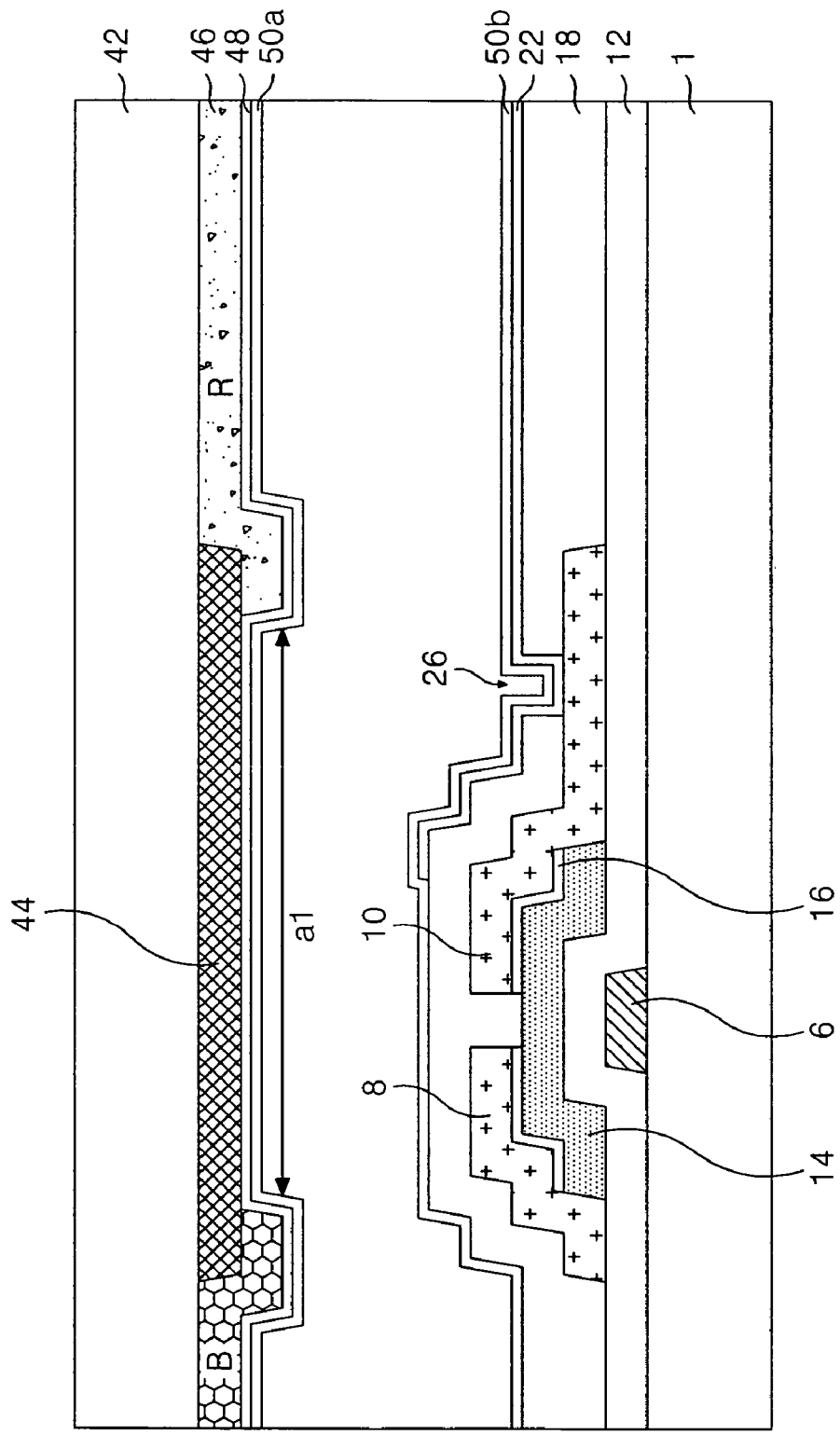
FIG. 1 is a sectional view representing a liquid crystal display panel according to the related art.
Figure 2:
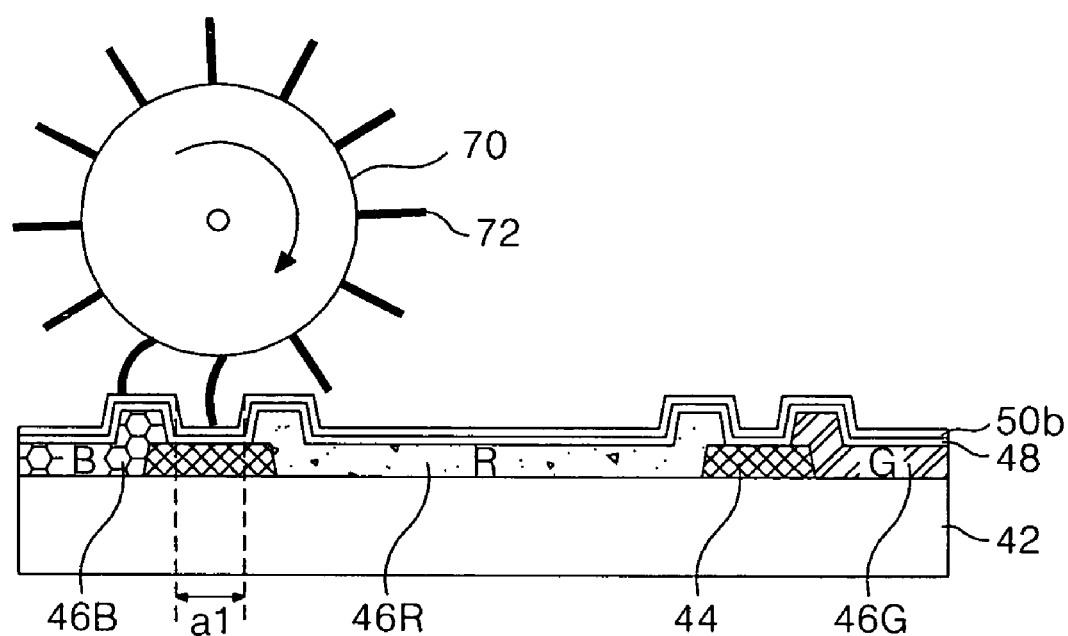
FIG. 2 is a sectional view representing that a rubbing process is carried out in a color filter array substrate of the liquid crystal display panel shown in FIG. 1 according to the related art.
Figure 3:
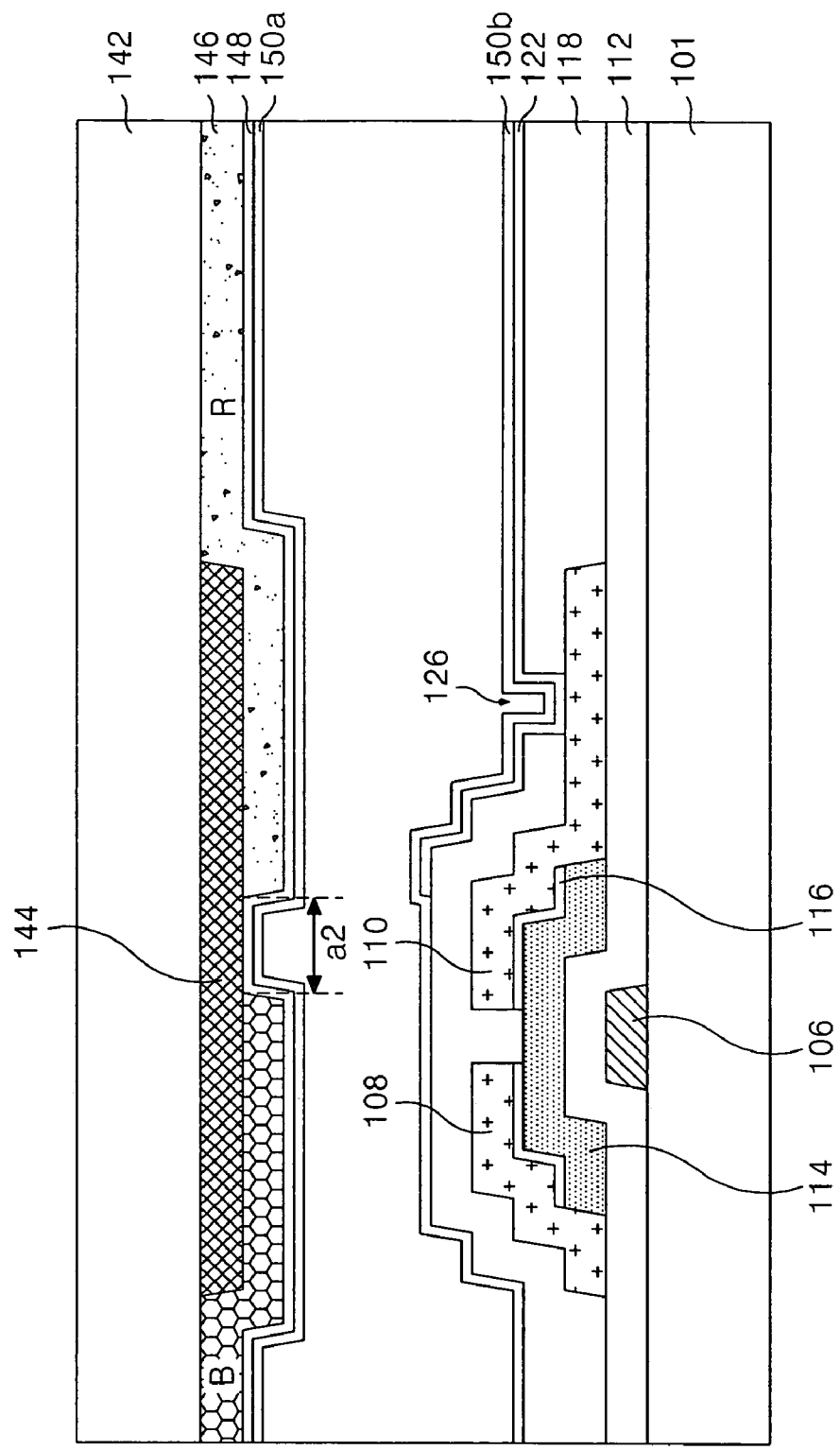
FIG. 3 is a diagram representing a liquid crystal display panel according to an embodiment of the present invention.

FIG. 3 is a diagram representing a liquid crystal display panel according to an embodiment of the present invention. Referring to FIG. 3, a liquid crystal display panel according to an embodiment of the present invention includes a color filter array substrate having a black matrix 144, a color filter 146, a common electrode 148 and an upper alignment film 150*a* sequentially formed on an upper substrate 142; a thin film transistor array substrate having a TFT, a pixel electrode 122 and a lower alignment film 150*b* formed on a lower substrate 101; and a liquid crystal layer (not shown) between the color filter array substrate and the thin film transistor array substrate.

The black matrix 144 is formed to substantially overlap gate lines, data lines (not shown) and a TFT area of the lower substrate 101, thereby defining a pixel area over which the color filter 146 is to be formed. The black matrix 144 substantially prevents light leakage and absorbs external light to enhance the contrast ratio.

The color filter 146 is formed at the pixel area, which is defined by the black matrix 144. The color filter 146 is formed by red R, green G, blue B filters to create red R, green G and blue B colors. The distance a2 between the adjacent color filters 146 may be set to be around 0.1 μm to 5 μm. In a particular embodiment, a2 is around 1 μm.

During operation, the common electrode 148 is supplied a common voltage, which may serve as a reference for a potential difference between the common electrode 148 and the pixel electrode 122 that is formed on the lower substrate 101.

The TFT includes a gate electrode 116 connected to the gate line (not shown), a source electrode 108 connected to the data line (not shown), and a drain electrode 110 connected to the pixel electrode 122 through a drain contact hole 126. Further, the TFT includes semiconductor layers 114 and 116 to form a conductive channel between the source electrode 108 and the drain electrode 110 by a gate voltage applied to the gate electrode 106. The TFT responds to a gate signal from the gate line (not shown) by creating a conductive channel between the source electrode 108 and the drain electrode 110, thereby applying the voltage of the source electrode 108 to the pixel electrode 122.

The pixel electrode 122 is located at a pixel area defined by the data line (not shown) and the gate line (not shown) and is formed of a transparent conductive material that has high light transmissivity. The pixel electrode 122 is formed on a protective film 118 spread substantially over the entire surface of the lower substrate 101 and is electrically connected with the drain electrode 110 through the drain contact hole 126 that penetrates a protective film 118. When an active gate signal is applied to the gate 106, the pixel electrode 122 generates a potential difference relative to the common electrode 148 formed on the upper substrate 142, with the potential difference corresponding to the data signal supplied through the TFT. The potential difference causes the liquid crystal molecules located between the lower substrate 101 and the upper substrate 142 to rotate as a function of the liquid crystal's dielectric anisotropy. The orientation of the liquid crystal molecules results in control of the amount of light that is transmitted from the light source, through the pixel electrode 12, and toward the upper substrate 142.

The upper/lower alignment films 150a and 150b for aligning the liquid crystal molecules are formed by having an alignment material such as polyimide spread respectively on the color filter array substrate and the TFT array substrate, and by rubbing the polyimide in a rubbing process.

FIG. 4A to 4G are sectional diagrams representing steps of an exemplary fabrication process according to the present invention, the process forming the color filter array substrate illustrated in FIG. 3.

Figure 4A:
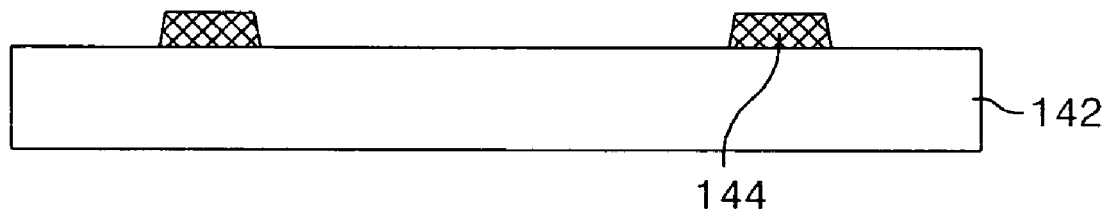
FIGS. 4A to 4G are sectional diagrams representing steps of a fabricating method according to an embodiment of the present invention, the method producing a color filter array substrate of the liquid crystal display panel illustrated in FIG. 3.

First, after an opaque metal is deposited on the upper substrate 142, the opaque material is patterned by a photolithography process using a first mask (not shown) and an etching process to form a black matrix 144, as illustrated in FIG. 4A.

Figure 4B:
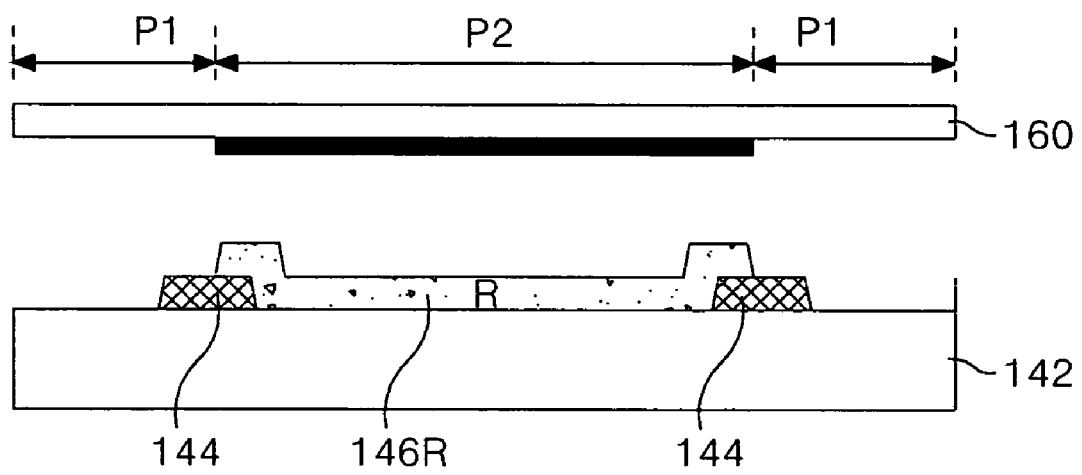

Next, a photosensitive red resin R is deposited substantially over the entire surface of the upper substrate 142 where the black matrix 144 has been formed. A second mask 160 is aligned on the upper substrate 142 where the red resin R has been deposited, wherein the second mask 160 has an exposure area P1 and a blocking area P2, which may be formed to be longer than that of the related art. Subsequently, the red resin R is exposed through the exposure area P1 of the second mask 160, and the exposed resin is removed by an etching process. The red resin R that is not exposed through the intercepting area P2 is left to form a red color filter 146R, as illustrated in FIG. 4B.

On the other hand, if the red resin R is non-photosensitive, a photo-resist (not shown) may be formed on the non photosensitive red resin R, which has been deposited substantially on the entire surface. The second mask 160 is then aligned on the upper substrate 142 where the photo-resist has been formed, wherein the second mask 160 has an exposure area P1 and a blocking area P2, which may be formed to be longer than that of the related art. Subsequently, the photo-resist is exposed through the exposure area P1, and the exposed photo-resist is removed by a photolithography process, and the photo-resist that is not exposed through the intercepting area P2 is left as a photo-resist pattern. Then, after the photo-resist pattern is hardened, the red resin R is patterned by an etching process using the hardened photo-resist pattern as a mask, thereby forming a red color filter 146R, as illustrated in FIG. 4B.

Figure 4C:
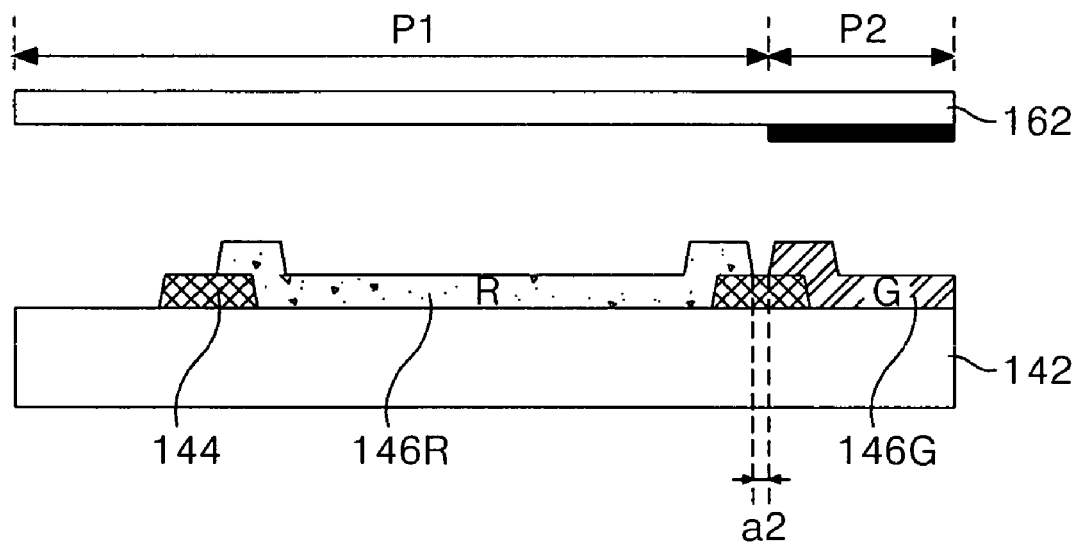

A green resin G is deposited substantially on the entire surface of the upper substrate 142 where the red color filter 146R has been formed. A third mask 162 is aligned on the upper substrate 142 where the green resin G has been deposited, wherein the third mask 162 has an exposure area P1 and a blocking area P2, which may be formed to be longer than that of the related art. Subsequently, the green resin G exposed through the exposure area P1 is removed by a photolithography process using the third mask 162 and the etching process, and the green resin G that is not exposed through the intercepting area P2 is left to form a green color filter 146G, as illustrated in FIG. 4C. At this stage, the distance a2 between the adjacent green color filter 146G and red color filter 146R may be set to be around 0.1 μg to 5 μm with the black matrix 144 between them. In a particular embodiment, a2 is set to be approximately equal to 1 μm.

On the other hand, if the green resin G is non-photosensitive, a photo-resist (not shown) may be formed on the non-photosensitive green resin G, which has been deposited substantially on the entire surface. The third mask 162 is aligned on the upper substrate 142 where the photo-resist has been formed, wherein the third mask 162 has an exposure area P1 and a blocking area P2, which may be formed to be longer than that of the related art. Subsequently, the photo-resist is exposed through the exposure area P1, and the exposed photo-resist is removed by a photolithography process, inclusive of exposure and development processes, and the photo-resist that is not exposed through the blocking area P2 is left as a photo-resist pattern. Then, after the photo-resist pattern is hardened, the green resin G is patterned by an etching process using the hardened photo-resist pattern as a mask, thereby forming a green color filter 146G, as illustrated in FIG. 4C.

Figure 4D:
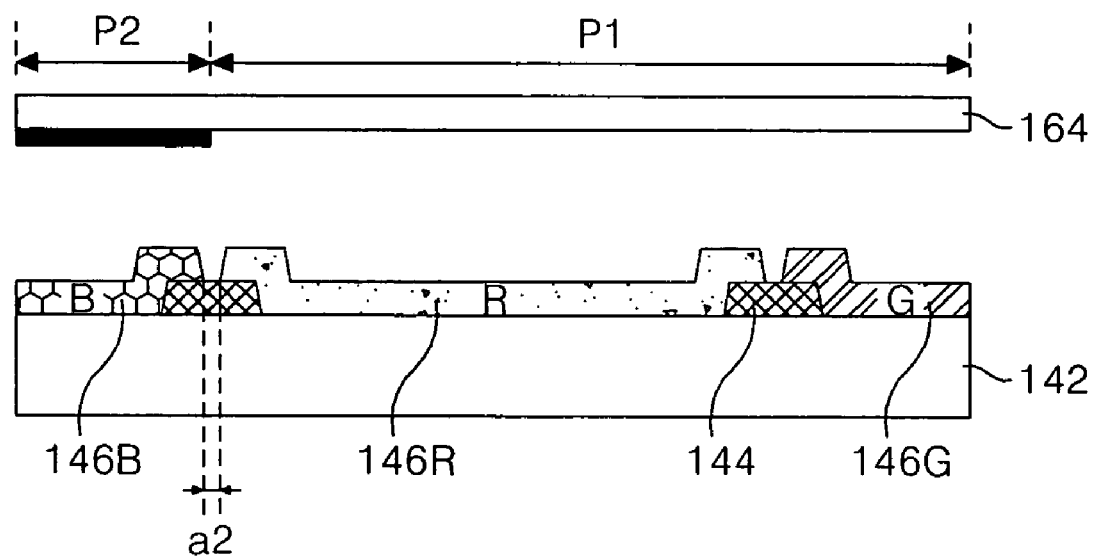

A blue resin B is deposited substantially on the entire surface of the upper substrate 142 where the green color filter 146G has been formed. A fourth mask 164 is aligned on the upper substrate 142 where the blue resin B has been deposited, wherein the fourth mask 164 has an exposure area P1 and a blocking area P2, which may be formed to be longer than that of the related art. Subsequently, the blue resin B is exposed through the exposure area P1, the exposed resin is removed by an etching process, and the blue resin B that is not exposed through the blocking area P2 is left to form a blue color filter 146B, as shown in FIG. 4D. The distance a2 between the adjacent blue color filter 146B and red color filter 146R may be set to be around 0.1 μm to 5 μm with the black matrix 144 between them. In a particular embodiment, a2 is set to be around 1 μm.

On the other hand, if the blue resin B is non-photosensitive, a photo-resist (not shown) may be formed on the non-photosensitive blue resin B, which has been deposited substantially on the entire surface. The fourth mask 164 is aligned on the upper substrate 142 where the photo-resist has been formed, wherein the fourth mask 164 has the exposure area P1 and the blocking area P2, which may be formed to be longer than that of the related art. Subsequently, the photo-resist is exposed through the exposure area P1, and the exposed photo-resist is removed by the photolithography process, inclusive of exposure and development processes, and the photo-resist that is not exposed through the blocking area P2 is left to form a photo-resist pattern. Then, after the photo-resist pattern is hardened, the blue resin B is patterned by an etching process using the hardened photo-resist pattern as a mask, thereby forming a blue color filter 146B, as illustrated in FIG. 4D.

It will be apparent to one skilled in the art that the formation of R, G, B filters need not be in the sequence as described, and that variations are possible and within the scope of the invention.

The amount of light exposed on the red, green and blue color filters 146R, 146G, 146B may be around 100~150 mj, and the light exposure gap may be around 250~290/m.

Figure 4E:
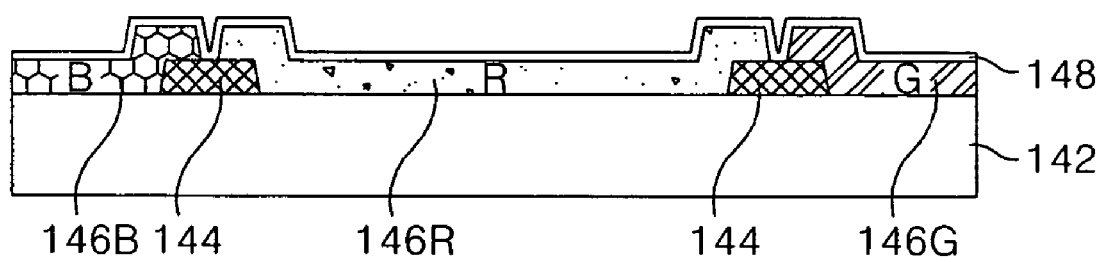

The transparent electrode material is deposited substantially on the entire surface of the upper substrate 142 where the red, green, blue color filters 146R, 146G, 146B have been formed, thereby forming the common electrode 148, as illustrated in FIG. 4E.

Figure 4F:
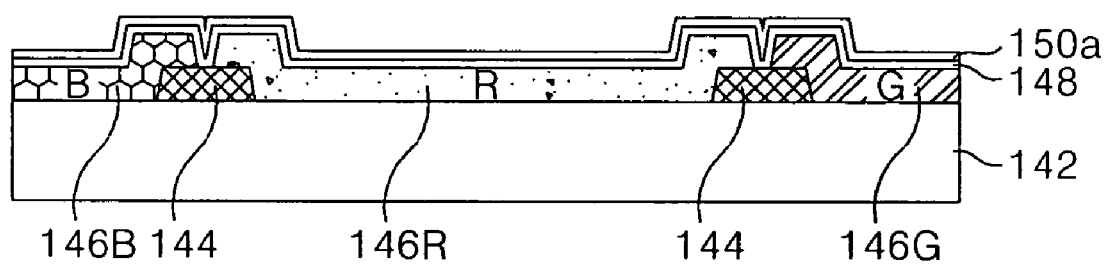

Next, an alignment material such as polyimide is formed over the upper substrate 142 where the common electrode 148 has been formed, to form an upper alignment film 150a, as illustrated in FIG. 4F.

Figure 4G:
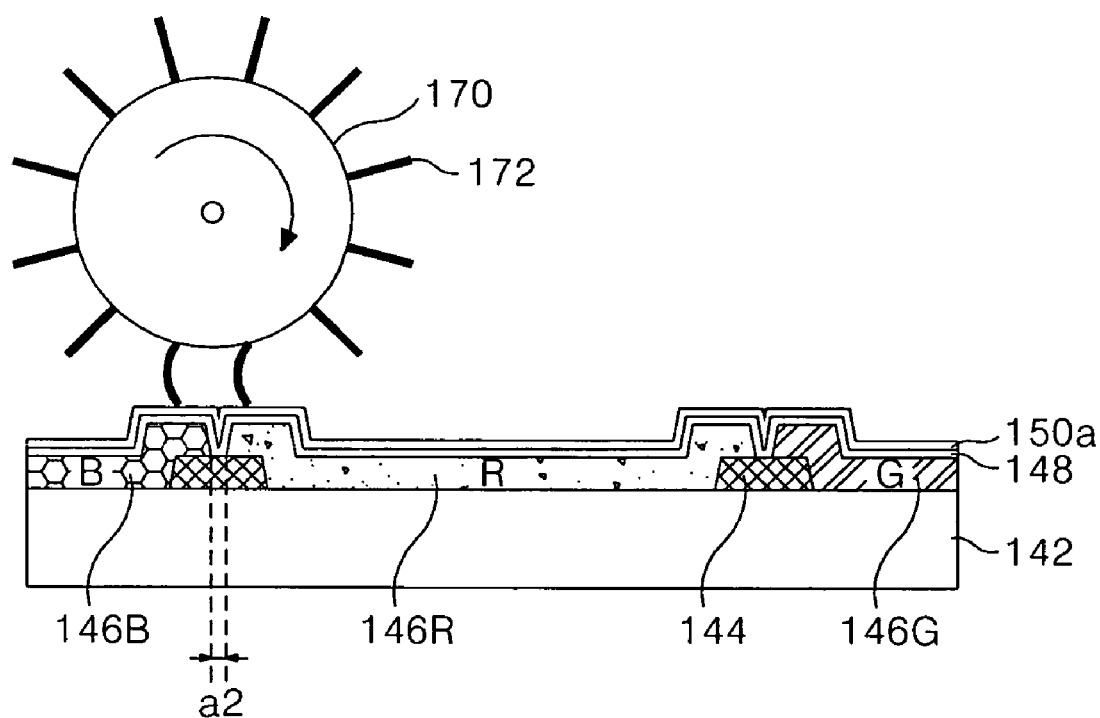

A rubbing process, as illustrated in FIG. 4G, is performed in order to arrange the liquid crystal molecules in a substantially uniform direction on the upper substrate 142 where the upper alignment film 150a has been formed. In a particular embodiment, the surface of the upper alignment film 150a is rubbed with a rubbing cloth 172, which is attached to a rubbing roller 170, at a uniform pressure and speed to align the polymer chain of the surface of the upper alignment film 150a, which subsequently substantially aligns the liquid crystal molecules. Herein, a coating material is coated in the rubbing cloth 172.

Accordingly, the liquid crystal display panel according to the embodiment of the present invention uses a mask pattern so that the distance between the red color filter 146R, the green color filter 146G and the blue color filter 146B is set to be around 0.1 μm to 5 μm, thereby substantially minimizing or eliminating any gap between adjacent color filters 146. With the distance between the red color filter 146R, the green color filter 146G and the blue color filter 146B set to be around 0.1 μm to 5 μm, separation of the material coated in the rubbing cloth 172 may be prevented during the rubbing process. Accordingly, by minimizing the influence of the stepped difference caused by the separation between the color filters 146 and the reverse taper of the photo-resist of the color filters 146, the rubbing process can be properly carried out, and thus the rubbing defects may be prevented.

Further, the present invention can be applied to IPS mode as well as a TN mode liquid crystal display panel devices.

As described above, the liquid crystal display panel and the fabricating method thereof according to the embodiment of the present invention involves use of a mask pattern designed so that the distance between the red color filter, the green color filter and the blue color filter may be minimized. Accordingly, the stepped difference by the separation distance between the color filters and the reverse taper phenomenon of the photo-resist may be minimized to prevent the coating material coated in the rubbing cloth from being separated when rubbing the surface of the alignment filter 150a with the rubbing cloth, thereby preventing rubbing defects caused by rubbing cloth damage.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of fabricating a liquid crystal display panel, comprising:
   forming a black matrix on a substrate, the black matrix defining a pixel area;
   forming color filters on the pixel area; and
   forming an alignment film on the black matrix and the color filters,
   wherein the forming color filters includes forming a red color filter, forming a green color filter, and forming a blue color filter,
   wherein both end portions of each color filter is formed on the black matrix, and
   wherein a distance between the red color filter and the green color filter is between about 2.1 μm and about 4.9 μm and a distance between the red color filter and the blue color filter is between about 2.1 μm and about 4.9 μm to minimize a step difference of the alignment film due to a separation between the color filters.

2. The method according to claim 1, further comprising:
   forming a transparent electrode on the substrate; and
   forming an alignment film on the substrate.

3. The method according to claim 1, wherein the forming an alignment film includes forming an alignment film having polyimide.

4. The method according to claim 1, further comprising rubbing the alignment film.

5. The method according to claim 4, wherein the rubbing the alignment film includes rubbing the alignment film with a rubbing cloth having a coating material.

6. The method according to claim 1, wherein the forming the red color filter includes:
   forming a photosensitive red resin on the substrate;
   aligning a mask over the substrate, the mask having an exposure area and a blocking area;
   exposing the mask to light; and
   removing photosensitive red resin corresponding to the exposure area.

7. The method according to claim 6, wherein the removing exposed photosensitive red resin includes etching the exposed photosensitive red resin.

8. The method according to claim 1, wherein the forming the red color filter includes:
   forming a non-photosensitive red resin on the substrate;
   forming a photo-resist on the non-photosensitive red resin;
   aligning a mask over the substrate, the mask having an exposure area and a blocking area;
   exposing the mask to light;
   removing photo-resist corresponding to the exposure area;
   hardening photo-resist corresponding to the blocking area; and
   removing non-photosensitive red resin corresponding to the exposure area.

9. The method according to claim 8, wherein the removing non-photosensitive red resin includes etching the non-photosensitive red resin.

* * * * *